United States Patent
McDaniel et al.

(10) Patent No.: US 12,246,312 B2
(45) Date of Patent: *Mar. 11, 2025

(54) PROCESSES FOR PRODUCING FLUORIDED SOLID OXIDES AND USES THEREOF IN METALLOCENE-BASED CATALYST SYSTEMS

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); Qing Yang, Bartlesville, OK (US); Tony R. Crain, Niotaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,002

(22) Filed: Apr. 18, 2024

(65) Prior Publication Data

US 2024/0261771 A1    Aug. 8, 2024

Related U.S. Application Data

(60) Continuation of application No. 18/351,546, filed on Jul. 13, 2023, now Pat. No. 11,998,902, which is a
(Continued)

(51) Int. Cl.
*B01J 37/00* (2006.01)
*B01J 23/60* (2006.01)
(Continued)

(52) U.S. Cl.
CPC .......... *B01J 37/0209* (2013.01); *B01J 23/60* (2013.01); *B01J 27/12* (2013.01); *B01J 27/138* (2013.01);
(Continued)

(58) Field of Classification Search
None
See application file for complete search history.

(56) References Cited

U.S. PATENT DOCUMENTS

| 3,242,099 A | 3/1966 | Manyik |
| 3,248,179 A | 4/1966 | Norwood |

(Continued)

FOREIGN PATENT DOCUMENTS

| AU | 7943782 A | 7/1982 |
| CN | 106795235 A | 5/2017 |

(Continued)

OTHER PUBLICATIONS

A.V. Lavrenov et al. "Catalysts based on anion-modified metal oxides for the production of environmentally friendly components of motor fuels", Russian Chemical Journal (J. Ros.him. ob-va named after D.I. Mendeleev), 2007, vol. LI, No. 4, pp. 75-83.

(Continued)

*Primary Examiner* — Stefanie J Cohen
(74) *Attorney, Agent, or Firm* — Merchant & Gould P.C.

(57) ABSTRACT

Disclosed herein are methods for preparing fluorided solid oxides by contacting an acidic fluorine-containing compound with an inorganic base to form an aqueous mixture having a pH of at least 4, followed by contacting a solid oxide with the aqueous mixture to produce the fluorided solid oxide. Also disclosed are methods for preparing fluorided solid oxides by contacting an acidic fluorine-containing compound with a solid oxide to produce a mixture, followed by contacting the mixture with a inorganic base to produce the fluorided solid oxide at a pH of at least about 4. The fluorided solid oxide can be used as an activator component in a catalyst system for the polymerization of olefins.

19 Claims, 2 Drawing Sheets

Related U.S. Application Data continuation of application No. 17/855,874, filed on Jul. 1, 2022, now Pat. No. 11,731,122, which is a division of application No. 16/581,811, filed on Sep. 25, 2019, now Pat. No. 11,420,196.

(60) Provisional application No. 62/737,157, filed on Sep. 27, 2018.

(51) Int. Cl.
  *B01J 27/12* (2006.01)
  *B01J 27/138* (2006.01)
  *B01J 31/12* (2006.01)
  *B01J 37/02* (2006.01)

(52) U.S. Cl.
  CPC .......... *B01J 31/122* (2013.01); *B01J 37/0203* (2013.01); *B01J 37/0213* (2013.01)

(56) References Cited

U.S. PATENT DOCUMENTS

| | | | |
|---|---|---|---|
| 4,407,731 A | 10/1983 | Imai | |
| 4,501,885 A | 2/1985 | Sherk | |
| 4,588,790 A | 5/1986 | Jenkins, III | |
| 4,794,096 A | 12/1988 | Ewen | |
| 4,808,561 A | 2/1989 | Welborn, Jr. | |
| 4,935,394 A | 6/1990 | Chang | |
| 5,143,706 A | 9/1992 | Schubert | |
| 5,352,749 A | 10/1994 | DeChellis | |
| 5,401,820 A | 3/1995 | McDaniel | |
| 5,436,304 A | 7/1995 | Griffin | |
| 5,565,175 A | 10/1996 | Hottovy | |
| 5,575,979 A | 11/1996 | Hanson | |
| 5,576,259 A | 11/1996 | Hasegawa | |
| 5,739,220 A | 4/1998 | Shamshoum | |
| 5,807,938 A | 9/1998 | Kaneko | |
| 5,919,983 A | 7/1999 | Rosen | |
| 5,981,417 A | 11/1999 | Drake | |
| 6,239,235 B1 | 5/2001 | Hottovy | |
| 6,262,191 B1 | 7/2001 | Hottovy | |
| 6,355,594 B1 | 3/2002 | McDaniel | |
| 6,833,415 B2 | 12/2004 | Kendrick | |
| 6,982,306 B2 | 1/2006 | Martin | |
| 7,026,494 B1 | 4/2006 | Yang | |
| 7,041,617 B2 | 5/2006 | Jensen | |
| 7,199,073 B2 | 4/2007 | Martin | |
| 7,226,886 B2 | 6/2007 | Jayaratne | |
| 7,294,599 B2 | 11/2007 | Jensen | |
| 7,312,283 B2 | 12/2007 | Martin | |
| 7,517,939 B2 | 4/2009 | Yang | |
| 7,531,606 B2 | 5/2009 | Hendrickson | |
| 7,598,327 B2 | 10/2009 | Shaw | |
| 7,601,665 B2 | 10/2009 | McDaniel | |
| 7,619,047 B2 | 11/2009 | Yang | |
| 7,884,163 B2 | 2/2011 | McDaniel | |
| 8,114,946 B2 | 2/2012 | Yang | |
| 8,309,485 B2 | 11/2012 | Yang | |
| 8,623,973 B1 | 1/2014 | McDaniel | |
| 8,703,886 B1 | 4/2014 | Yang | |
| 8,822,608 B1 | 9/2014 | Bhandarkar | |
| 8,916,494 B2 | 12/2014 | McDaniel | |
| 9,023,959 B2 | 5/2015 | McDaniel | |
| 9,303,106 B1 | 4/2016 | Clark | |
| 9,365,667 B2 | 6/2016 | McDaniel | |
| 9,670,296 B2 | 6/2017 | McDaniel | |
| 9,745,230 B2 | 8/2017 | Small | |
| 9,758,599 B2 | 9/2017 | Ding | |
| 2003/0153726 A1 | 8/2003 | Eckhardt | |
| 2004/0059070 A1 | 3/2004 | Whitte | |
| 2004/0188092 A1 | 9/2004 | Santra | |
| 2005/0113245 A1 | 5/2005 | Martin | |
| 2008/0280046 A1 | 11/2008 | Bryden | |
| 2010/0076167 A1* | 3/2010 | McDaniel | C08F 10/02 502/155 |
| 2010/0227989 A1 | 9/2010 | Yang | |
| 2010/0331505 A1 | 12/2010 | Masino | |
| 2012/0095174 A1 | 4/2012 | Marin | |
| 2013/0172498 A1 | 7/2013 | Hlavinka | |
| 2015/0018503 A1* | 1/2015 | McDaniel | B01J 37/26 502/154 |

FOREIGN PATENT DOCUMENTS

| | | |
|---|---|---|
| DE | 3200514 A1 | 8/1982 |
| DE | 10018918 C2 | 7/2002 |
| EP | 3856407 A2 | 8/2021 |
| GB | 2007636 B | 1/1982 |
| RU | 2237066 C2 | 9/2004 |
| WO | 1993016798 A1 | 9/1993 |
| WO | 2020068888 A2 | 4/2020 |

OTHER PUBLICATIONS

Bird, R. Byron, et al., "Dynamics of Polymeric Liquids," Fluid Mechanics, vol. 1, Second Edition, 1987, cover page, publishing page, pp. xili-xviii, and 171-172, John Wiley & Sons, Inc.

Brunauer, et al., "Adsorption of Gases in Multimolecular Layers", Journal of the American Chemical Society, 1938, vol. 60, pp. 309-319.

Film Extrusion Manual—Process, Materials, Properties, TAPPI Press, 1992, 16 pages.

Halsey, "Physical Adsorption on Non-Uniform Surfaces," Journal Chem. Phys., vol. 18, Mar. 9, 1948, pp. 931-937.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta. 1989, pp. 321-332, vol. 28.

IUPAC Compendium of Chemical Terminology, 2nd Ed. 1997, pp. 1-1670.

Kumar Dinesh et al: "Catalytic procedures for multicomponent synthesis of imidazoles: selectivity control during the competitive formation of tri- and tetrasubsituted imidazoles", Green Chemistry, vol. 14, No. 7, Jan. 1, 2012, p. 2038, XP055925873, GB ISSN: 1463-9262, DOI: 10.1039/c2gc35277j.

Modern Plastics Encyclopedia, Mid-Nov. 1995 Issue, vol. 72, No. 12, 3 pages.

N.V. Semikolenova et al. "The role of acid sites in the formation of supported catalysts for the polymerization of olefins based on metallocenes", Russian Chemical Journal (J. Ros.him. ob-va named after D.I. Mendeleev), 2001, vol. XLV. No. 4, pp. 68-74.

* cited by examiner

PROCESSES FOR PRODUCING FLUORIDED SOLID OXIDES AND USES THEREOF IN METALLOCENE-BASED CATALYST SYSTEMS

REFERENCE TO RELATED APPLICATION

This application is a continuation application of U.S. patent application Ser. No. 18/351,546, filed on Jul. 13, 2023, now U.S. Pat. No. 11,998,902, which is a continuation application of U.S. patent application Ser. No. 17/855,874, filed on Jul. 1, 2022, now U.S. Pat. No. 11,731,122, which is a divisional application of U.S. patent application Ser. No. 16/581,811, filed on Sep. 25, 2019, now U.S. Pat. No. 11,420,196, which claims the benefit of U.S. Provisional Patent Application No. 62/737,157, filed on Sep. 27, 2018, the disclosures of which are incorporated herein by reference in their entirety.

BACKGROUND OF THE INVENTION

The present invention relates generally to the field of olefin polymerization catalysis, supported catalyst compositions, methods for the polymerization of olefins, and polyolefins. More specifically, this invention relates to fluorided solid oxides, methods for making fluorided solid oxides, and to catalyst compositions and polymerization processes employing these fluorided solid oxides.

Fluorine compounds such as hydrogen fluoride and hydrofluoric acid are very corrosive and can release harmful gasses during processing. Thus, it would be beneficial to utilize fluorine compounds to produce fluorided solid oxides in a safer manner and with little or no emissions. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes for producing fluorided solid oxides are disclosed and described herein. A first process for producing a fluorided solid oxide can comprise (a) contacting an acidic fluorine-containing compound and an inorganic base to produce an aqueous mixture having a pH of at least about 4, and (b) contacting a solid oxide with the aqueous mixture to produce the fluorided solid oxide. A second process for producing a fluorided solid oxide can comprise (A) contacting an acidic fluorine-containing compound with a solid oxide to produce a mixture; and (B) contacting the mixture with an inorganic base to produce the fluorided solid oxide at a pH of at least about 4. In non-limiting aspects of this invention, the acidic fluorine-containing compound can comprise tetrafluoroboric acid ($HBF_4$) and/or hexafluorosilicic acid ($H_2SiF_6$), the inorganic base can comprise a zinc-containing base such as ZnO, and the solid oxide can comprise silica-alumina and/or silica-coated alumina.

Catalyst compositions containing these fluorided solid oxides also are provided by the present invention. One such catalyst composition can comprise a metallocene compound, a fluorided solid oxide, and an optional co-catalyst. Catalyst compositions of the present invention can be used to polymerize olefins to form homopolymers, copolymers, terpolymers, and the like. A process for polymerizing olefins in the presence of a catalyst composition of the present invention can comprise contacting the catalyst composition with an olefin monomer and optionally an olefin comonomer in a polymerization reactor system under polymerization conditions to produce an olefin polymer.

Polymers produced from the polymerization of olefins, resulting in ethylene-based or propylene-based homopolymers or copolymers, for example, can be used to produce various articles of manufacture.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

DEFINITIONS

Figure 1:
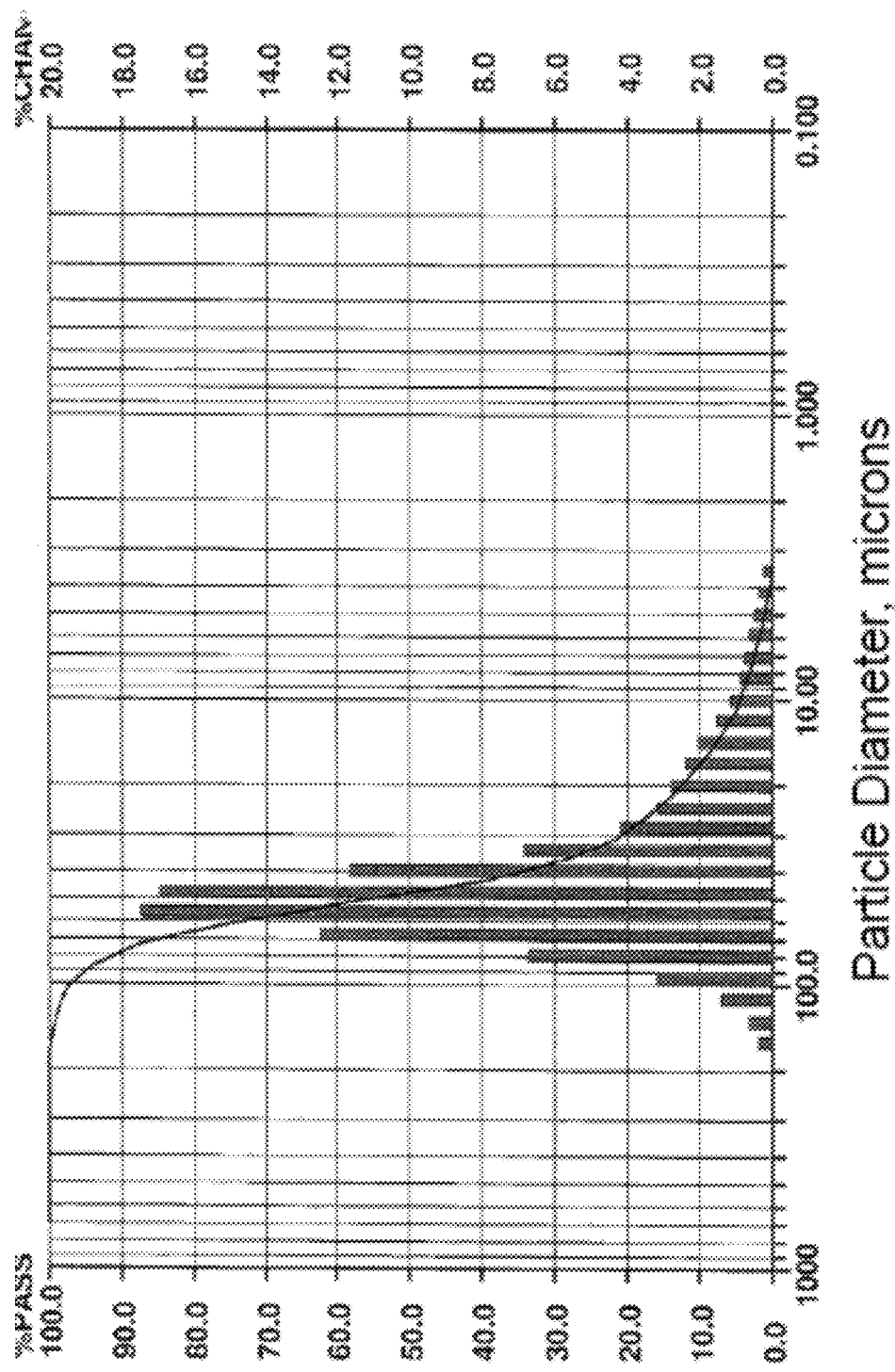
FIG. 1 presents a plot of the particle size distribution of the fluorided solid oxide of Example 15.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, or methods described herein are contemplated with or without explicit description of the particular combination. Additionally, unless explicitly recited otherwise, any aspect and/or feature disclosed herein can be combined to describe inventive designs, compositions, processes, or methods consistent with the present disclosure.

While compositions and methods/processes are described herein in terms of "comprising" various components or steps, the compositions and methods/processes also can "consist essentially of" or "consist of" the various components or steps, unless stated otherwise. For example, a catalyst composition consistent with aspects of the present invention can comprise; alternatively, can consist essentially of; or alternatively, can consist of; a metallocene compound, a fluorided solid oxide, and a co-catalyst.

The terms "a," "an," "the," etc., are intended to include plural alternatives, e.g., at least one, unless otherwise specified. For instance, the disclosure of "a metallocene compound" or "a comonomer" is meant to encompass one, or mixtures or combinations of more than one, metallocene compound or comonomer, respectively, unless otherwise specified.

Generally, groups of elements are indicated using the numbering scheme indicated in the version of the periodic table of elements published in Chemical and *Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, the "polymers" disclosed herein (e.g., ethylene polymers) also can be referred to as "polymer compositions."

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to a fluorided solid oxide. The term "co-catalyst" is used regardless of the actual function of the compound or any chemical mechanism by which the compound may operate.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, or the fluorided solid oxide, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contacting" is used herein to refer to materials or components which can be blended, mixed, slurried, dissolved, immersed, reacted, treated, sprayed, impregnated, compounded, or otherwise contacted or combined in some other manner or by any suitable method. The materials or components can be contacted or combined together in any order, in any manner, and for any length of time, unless otherwise specified.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the pH of an aqueous mixture can be in certain ranges in various aspects of this invention. By a disclosure that the pH can be in a range from about 4 to about 8, the intent is to recite that the pH can be any value within the range and, for example, can be equal to about 4, about 4.5, about 5, about 5.5, about 6, about 6.5, about 7, about 7.5, or about 8. Additionally, the pH can be within any range from about 4 to about 8 (for example, from about 4 to about 7.5), and this also includes any combination of ranges between about 4 and about 8 (for example, the pH can be in a range from about 4.2 to about 6.8, or from about 4.5 to about 6.5). Further, in all instances, where "about" a particular value is disclosed, then that value itself is disclosed. Thus, the disclosure of a pH range from about 4 to about 8 also discloses a pH range from 4 to 8 (for example, from 4 to 7.5), and this also includes any combination of ranges between 4 and 8 (for example, the pH can be in a range from 4.2 to 6.8, or from 4.5 to 6.5). Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate"

whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION

The present invention is directed generally to fluorided solid oxides, methods of making the fluorided solid oxides, catalyst compositions employing the fluorided solid oxides, methods for using the catalyst compositions to polymerize olefins, the polymer resins produced using such catalyst compositions, and articles of manufacture produced using these polymer resins.

Commercially produced fluorided solid oxides, such as fluorided silica-coated alumina, typically are prepared by immersing the solid oxide in a strongly acidic solution of HF (or hydrofluoric acid), and allowing the fluorine sufficient time to impregnate and react with the solid oxide. This process typically takes 12 hours before spray drying. Otherwise, if the reaction is incomplete, HF vapors can be released into the atmosphere. Then, the neutralized slurry is spray dried to produce very fine fluorided solid oxide particles, generally with a d50 average particle size of less than 40 microns, and in some instances, less than 35 microns. Further, due to fluorine emissions and safety considerations, this method of making fluorided solid oxides is not practiced in the United States.

The processes disclosed herein for preparing fluorided solid oxides offer several advantages. In one process, the acidic fluorine compound is reacted with an inorganic base, such that the resulting aqueous fluorine-containing mixture does not emit potentially hazardous hydrogen fluoride fumes to the atmosphere during spray drying. Moreover, by increasing the pH of the aqueous mixture to a relatively neutral pH (>4.0), not only is the potential for hydrogen fluoride emissions eliminated prior to spray drying, but the corrosivity of the aqueous fluorine-containing mixture also is significantly reduced. Further, the time needed for the acid to be neutralized is significantly reduced, resulting in a more cost-efficient process. Additionally, fluorided solid oxides with a d50 average particle size of greater than 40 microns, and in some instances, greater than 50 microns can readily be produced.

In another process, the acidic fluorine compound is contacted initially with the solid oxide, but then followed by inorganic base addition to increase the pH to a relatively neutral pH. Thus, as above, potentially hazardous hydrogen fluoride fumes are not emitted to the atmosphere during spray drying, and the corrosivity of the fluorided solid oxide to spray drying and other equipment also is significantly reduced.

Another potential benefit to the disclosed processes, while not being a requirement, is that the inorganic base also can be selected to increase the overall catalytic activity of the fluorided solid oxide, such as by the addition of zinc or other suitable metal. FLUORIDED SOLID OXIDES Various processes for producing a fluorided solid oxide are disclosed and described herein. A first process to produce the fluorided solid oxide can comprise (or consist essentially of, or consist of) (a) contacting an acidic fluorine-containing compound and an inorganic base to produce an aqueous mixture having a pH of at least about 4, and (b) contacting a solid oxide with the aqueous mixture to produce the fluorided solid oxide. A second process for producing a fluorided solid oxide can comprise (or consist essentially of, or consist of) (A) contacting an acidic fluorine-containing compound with a solid oxide to produce a mixture; and (B) contacting the mixture with an inorganic base to produce the fluorided solid oxide at a pH of at least about 4.

Generally, the features of any of the processes disclosed herein (e.g., the acidic fluorine-containing compound, the inorganic base, the pH, the solid oxide, and the conditions under which the steps are conducted, among others) are independently described herein, and these features can be combined in any combination to further describe the disclosed processes. Moreover, other process steps can be conducted before, during, and/or after any of the steps listed in the disclosed processes, unless stated otherwise. Additionally, fluorided solid oxides (also referred to as activator-supports or chemically-treated solid oxides) produced in accordance with the disclosed processes are within the scope of this disclosure and are encompassed herein.

Referring now to step (a) of the first process, an acidic fluorine-containing compound and an inorganic base can be contacted to produce an aqueous mixture having a pH of at least about 4. The order in which the components in step (a) are combined to produce the aqueous mixture is not particularly limited. In one aspect, for instance, the acidic fluorine-containing compound can be contacted first with water, and then the inorganic base, to produce the aqueous mixture, while in another aspect, the inorganic base can be contacted first with water, and then the acidic fluorine-containing compound, to produce the aqueous mixture.

Any suitable acidic fluorine-containing compound can be used in step (a). Illustrative and non-limiting examples of the acidic fluorine-containing compound include hydrogen fluoride (HF), ammonium bifluoride ($NH_4HF_2$), triflic acid ($CF_3SO_3H$), tetrafluoroboric acid ($HBF_4$), hexafluorosilicic acid ($H_2SiF_6$), hexafluorophosphoric acid ($HPF_6$), and the like. Combinations of two or more acidic fluorine-containing compounds can be used to produce the aqueous mixture. In one aspect, the acidic fluorine-containing compound can comprise (or consist essentially of, or consist of) hydrogen fluoride (HF), ammonium bifluoride ($NH_4HF_2$), triflic acid ($CF_3SO_3H$), tetrafluoroboric acid ($HBF_4$), hexafluorosilicic acid ($H_2SiF_6$), hexafluorophosphoric acid ($HPF_6$), or any combination thereof. In another aspect, the acidic fluorine-containing compound can comprise (or consist essentially of, or consist of) hydrogen fluoride (HF); alternatively, ammonium bifluoride ($NH_4HF_2$); alternatively, triflic acid ($CF_3SO_3H$); alternatively, tetrafluoroboric acid ($HBF_4$); alternatively, hexafluorosilicic acid ($H_2SiF_6$); or alternatively, hexafluorophosphoric acid ($HPF_6$). In yet another aspect, the acidic fluorine-containing compound can comprise tetrafluoroboric acid ($HBF_4$), hexafluorosilicic acid ($H_2SiF_6$), or both.

Likewise, various inorganic bases can be used, and the inorganic bases typically contain a metal. For instance, the inorganic base can contain Zn, Al, Fe, Mn, Ca, Mg, or combinations thereof (a zinc-containing inorganic base, an aluminum-containing inorganic base, an iron-containing inorganic base, a manganese-containing inorganic base, a calcium-containing inorganic base, a magnesium-containing inorganic base, or combinations thereof). Thus, representative examples of inorganic bases that can be utilized in the disclosed processes, can include, but are not limited to, ZnO, $Zn(OH)_2$, $ZnCO_3$, $Al(OH)_3$, $Al_2O_3$, AlOOH, $Fe_2O_3$, $Fe(OH)_3$, $Fe(OH)_2$, $MnO_2$, $Mn(OH)_2$, $Ca(OH)_2$, $CaCO_3$, $Mg(OH)_2$, $MgCO_3$, and the like. Combinations of two or more inorganic bases can be used to produce the aqueous mixture. In accordance with one aspect of this invention, the inorganic base can comprise ZnO, $Zn(OH)_2$, and/or $ZnCO_3$, while in another aspect, the inorganic base can comprise $Al(OH)_3$, $Al_2O_3$, and/or AlOOH, and in another aspect, the inorganic base can comprise $Fe_2O_3$, $Fe(OH)_3$, and/or $Fe(OH)_2$, and in another aspect, the inorganic base can comprise $MnO_2$ and/or $Mn(OH)_2$, and in yet another aspect, the inorganic base can comprise $Ca(OH)_2$ and/or $CaCO_3$, and in still another aspect, the inorganic base can comprise $Mg(OH)_2$ and/or $MgCO_3$.

The acidic fluorine-containing compound and the inorganic base can be combined to produce an aqueous mixture having a pH of at least about 4. While not limited thereto, the pH often can be generally neutral, and typically can fall within a range from about 4 to about 8, such as from about 4 to about 7.5, from about 4 to about 6, from about 4 to about 5.5, from about 4 to about 5, from about 4.2 to about 7.5, from about 4.2 to about 6.8, from about 4.2 to about 5.5, from about 4.5 to about 7.5, from about 4.5 to about 6.5, from about 5 to about 8, from about 5 to about 7, or from about 5 to about 6.

The relative number of acid equivalents of the acidic fluorine-containing compound to the number of basic equivalents of the inorganic base that are combined in step (a) can be selected such that a pH of at least about 4 is maintained. Depending upon the particular acidic fluorine-containing compound and inorganic base that are utilized, among other factors, the ratio of acid:base equivalents (acidic fluorine-containing compound to inorganic base) generally ranges from about 1.3:1 to about 1:3. Thus, in one aspect of this invention, the ratio of acid:base equivalents can be in a range from about 1.2:1 to about 1:2, and in another aspect, the ratio can be in a range from about 1:1 to about 1:2, and in still another aspect, the ratio can be in a range from about 1:1.1 to about 1:1.8. As an example, 1 mole of $Zn(OH)_2$ (or ZnO or $ZnCO_3$) contains 2 base equivalents, whereas 1 mole of HF (or $HBF_4$) contains 1 acid equivalent.

The respective molar amount of F to the number of base equivalents of the inorganic base in the aqueous mixture is not particularly limited. Generally, the ratio can be in a range of from about 0.5:1 to about 8:1, from about 0.8:1 to about 7:1, or from about 1:1 to about 6:1.

Also, dependent upon the pH and the particular acidic fluorine-containing compound and inorganic base that are utilized, amongst other factors, the aqueous mixture can be a solution, or the aqueous mixture can be a slurry (e.g., with visible precipitation). Step (a)—and step (b)—of the process can be performed in any suitable vessel, such as a stirred tank.

Step (a) of the process can be conducted at a variety of temperatures and time periods. For instance, the acidic fluorine-containing compound and the inorganic base can be combined to produce the aqueous mixture having a pH of at least about 4 at a temperature in a range from about 10° C. to about 60° C.; alternatively, from about 10° C. to about 40° C.; alternatively, from about 10° C. to about 30° C.; alternatively, from about 15° C. to about 45° C.; alternatively, from about 15° C. to about 35° C.; alternatively, from about 20° C. to about 40° C.; or alternatively, from about 20° C. to about 30° C. In these and other aspects, these temperature ranges also are meant to encompass circumstances where step (a) is conducted at a series of different temperatures, instead of at a single fixed temperature, falling within the respective ranges, wherein at least one temperature is within the recited ranges. Generally, ambient temperatures are conveniently used, and high temperatures are typically avoided, in order to prevent gaseous fluorine compounds from being released.

The duration of step (a) is not limited to any particular period of time, so long as the acidic fluorine-containing compound and the inorganic base have been sufficiently mixed to result in the aqueous mixture having a pH of at least about 4. Generally, however, step (a) can be conducted in a time period that can be in a range from about 30 sec to about 8 hr, such as, for example, from about 1 min to about 2 hr, from about 1 min to about 30 min, from about 5 min to about 4 hr, from about 5 min to about 15 hr, and the like.

Referring now to step (b) of the first process, in which the aqueous mixture is contacted with a solid oxide to produce the fluorided solid oxide. Step (b) of the first process can be conducted at a variety of temperatures and time periods, such as those disclosed herein for step (a), but not being limited thereto. Non-limiting examples of suitable fluorided solid oxides are disclosed in, for instance, U.S. Pat. Nos. 7,294,599, 7,601,665, 7,884,163, 8,309,485, 8,623,973, 8,703,886, and 9,023,959, which are incorporated herein by reference in their entirety.

The fluorided solid oxide can contain any suitable solid oxide, such as a solid oxide containing a Lewis-acidic metal ion. The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163 (e.g., Sasol Siral® 28, Sasol Siral® 40, etc.).

In one aspect, the solid oxide can comprise alumina, silica-alumina, silica-coated alumina, aluminum phosphate, aluminophosphate, heteropolytungstate, titania, zirconia, magnesia, boria, any mixed oxide thereof, or any combination thereof. In another aspect, the solid oxide can comprise alumina, silica-alumina, silica-coated alumina, aluminum phosphate, aluminophosphate, heteropolytungstate, titania, zirconia, magnesia, or boria, as well as any mixed oxide thereof, or any mixture thereof. In another aspect, the solid oxide can comprise alumina, titania, zirconia, magnesia, boria, any mixed oxide thereof, or any combination thereof, while in another aspect, the solid oxide can comprise silica-alumina, silica-coated alumina, silica-titania, silica-zirconia, alumina-boria, or any combination thereof. In yet another aspect, the solid oxide can comprise alumina, titania, zirconia, magnesia, boria, silica-alumina, silica-coated alumina, silica-titania, silica-zirconia, alumina-boria, and the like, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have a silica content from about 5 to about 95% by weight. In one aspect, the silica content of these solid oxides can be from about 10 to about 80%, or from about 20% to about 70%, silica by weight. In another aspect, such materials can have silica contents ranging from about 15% to about 60%, from about 25% to about 50%, or from about 25% to about 45%, silica by weight. The solid oxides contemplated herein can have any suitable surface area, pore volume, and particle size, as would be recognized by those of skill in the art.

In an aspect, the fluorided solid oxide can comprise (or consist essentially of, or consist of) fluorided alumina, fluorided titania, fluorided zirconia, fluorided magnesia, fluorided boria, fluorided silica-alumina, fluorided silica-coated alumina, fluorided silica-titania, fluorided silica-zirconia, fluorided alumina-boria, and the like, as well as any mixture or combination thereof. In another aspect, the fluorided solid oxide can comprise fluorided alumina, fluorided silica-alumina, fluorided silica-zirconia, fluorided silica-titania, fluorided silica-coated alumina, and the like, as well as any mixture or combination thereof. In yet another aspect, the fluorided solid oxide can comprise fluorided alumina; alternatively, fluorided titania; alternatively, fluorided zirconia; alternatively, fluorided magnesia; alternatively, fluorided boria; alternatively, fluorided silica-alumina; alternatively, fluorided silica-coated alumina; alternatively, fluorided silica-titania; alternatively, fluorided silica-zirconia; or alternatively, fluorided alumina-boria.

While not being limited thereto, the fluorided solid oxide generally can contain from about 0.5 to about 15 wt. % F, based on the weight of the fluorided solid oxide (on a dry basis, excluding water). In particular aspects provided herein, the fluorided solid oxide can contain from about 1 to about 12 wt. %, from about 1 to about 8 wt. %, from about 2 to about 15 wt. %, from about 2 to about 9 wt. %, from about 2 to about 7 wt. %, from about 3 to about 12 wt. %, or from about 3 to about 7 wt. % F, based on the total weight of the fluorided solid oxide.

If the fluorine-containing compound includes boron, such as $HBF_4$, then the fluorided solid oxide often can contain from about 0.2 to about 1.2 wt. % B, and in some aspects, from about 0.3 to about 1 wt. % B, or from about 0.4 to about 0.9 wt. % B, based on the total weight of the fluorided solid oxide (on a dry basis, excluding water).

Likewise, while not being limited thereto, the fluorided solid oxide also can contain from about 0.5 to about 15 wt. % of the metal of the inorganic base (e.g., Zn, Fe, Mn, Ca, and Mg, either singly or in any combination), based on the weight of the fluorided solid oxide (on a dry basis, excluding water). For instance, as a result of using ZnO as the inorganic base, the fluorided solid oxide can contain from about 0.5 to about 15 wt. % of Zn. Likewise, if $Mg(OH)_2$ is the inorganic base, the fluorided solid oxide can contain from about 0.5 to about 15 wt. % of Mg. If desired, a mixture of inorganic bases can be used, such as a mixture of ZnO and $MgCO_3$; in such instances, the fluorided solid oxide contain a total Zn and Mg content that falls within a range from about 0.5 to about 15 wt. %. In particular aspects provided herein, the fluorided solid oxide can contain from about 0.5 to about 5 wt. %, from about 1 to about 12 wt. %, from about 1 to about 10 wt. %, from about 1 to about 8 wt. %, from about 1 to about 5 wt. %, from about 1 to about 3.5 wt. %, from about 1.5 to about 8 wt. %, or from about 1.5 to about 5 wt. %, of the metal of the inorganic base, based on the total weight of the fluorided solid oxide.

These respective amounts of fluorine, boron (if present), and metal (e.g., Zn, Fe, Mn, Ca, and Mg, either singly or in any combination) on the fluorided solid oxide can be present after drying and before calcining the fluorided solid oxide, as well as after calcining the fluorided solid oxide.

Prior to calcining, the fluorided solid oxide also can be characterized by the presence of a reaction product of the acidic fluorine-containing compound and the inorganic base. In one aspect, for instance, when the acidic fluorine-containing compound is tetrafluoroboric acid ($HBF_4$) and the inorganic base is a zinc-containing base such as ZnO, then the fluorided solid oxide can comprise a solid oxide and from about 1 to about 18 wt. % (or from about 3 to about 13 wt. %, or from about 4 to about 10 wt. %, or from about 5 to about 9 wt. %) of $Zn(BF_4)_2$. In another aspect, when the acidic fluorine-containing compound is hexafluorosilicic acid ($H_2SiF_6$) and the inorganic base is a zinc-containing base such as ZnO, then the fluorided solid oxide can comprise a solid oxide and from about 1 to about 18 wt. % (or from about 3 to about 13 wt. %, or from about 4 to about 10 wt. %, or from about 5 to about 9 wt. %) of $ZnSiF_6$.

The fluorided solid oxide can have any suitable total pore volume, BET surface area, and particle size. As a non-limiting example, the fluorided solid oxide can have a total pore volume in a range from about 0.5 to about 2.5 mL/g in one aspect, from about 0.5 to about 2 mL/g in another aspect, and from about 0.7 to about 1.5 mL/g in yet another aspect. The BET surface area of the fluorided solid oxide is not particularly limited, and can range from about 150 to about 700 $m^2/g$ in one aspect, from about 200 to about 700 $m^2/g$ in another aspect, and from about 250 to about 500 $m^2/g$ in yet another aspect. Similarly, the average (d50) particle size of the fluorided solid oxide is not particularly limited, and can range from about 10 to about 500 microns in one aspect, from about 25 to about 200 microns in another aspect, and from about 20 to about 100 microns in yet another aspect.

Optionally, an additional metal or metals can be impregnated on the fluorided solid oxide. While not limited thereto, this can be accomplished by contacting a metal-containing compound with the acidic fluorine-containing compound and the inorganic base. The metal-containing compound can include the metal and an organic group (e.g., acetate) or the metal-containing compound can be inorganic (e.g., nitrate). Illustrative metals can include, but are not limited to, zinc, nickel, cobalt, vanadium, titanium, silver, copper, gallium, tin, tungsten, molybdenum, zirconium, and the like, or combinations thereof. The metal in the inorganic base and the metal in the metal-containing compound can be the same (e.g., zinc) or different (e.g., zinc and cobalt). In one aspect, the metal-containing compound can comprise an organozinc compound, such as zinc acetate and/or zinc formate.

When an additional metal is impregnated, the fluorided solid oxide can contain any suitable amount of the metal of the metal-containing compound, often ranging from about 0.5 to about 10 wt. % of the metal of the metal-containing compound, based on the weight of the fluorided solid oxide (on a dry basis, excluding water). In particular aspects provided herein, the fluorided solid oxide can contain from about 0.5 to about 5 wt. %, from about 1 to about 12 wt. %, from about 1 to about 10 wt. %, from about 1 to about 8 wt. %, from about 1 to about 4 wt. %, from about 1.5 to about 8 wt. %, or from about 1.5 to about 5 wt. %, of the metal of the metal-containing compound, based on the total weight of the fluorided solid oxide.

Referring now to the second process for producing a fluorided solid oxide, which can comprise (A) contacting an acidic fluorine-containing compound with a solid oxide to produce a mixture, and (B) contacting the mixture with a inorganic base to produce the fluorided solid oxide at a pH of at least about 4. In the second process, the selections for the acidic fluorine-containing compound, the solid oxide, the inorganic base, and the fluorided solid oxide are the same as those described herein for the first process. Likewise, the pH conditions, the acid-base equivalents, the molar ratios of F to base equivalents, and other features disclosed herein for the first process also are applicable to the second process. Additionally, step (A) and step (B) of the second process can be conducted at a variety of temperatures and time periods, such as those disclosed herein for step (a) of the first process, but not being limited thereto.

The first process and the second process can further comprise a step of drying the fluorided solid oxide, and any suitable technique or any technique disclosed herein can be utilized. For instance, excess liquid can be removed from the fluorided solid oxide (e.g., draining, filtering, etc.), and the wet fluorided solid oxide can be subjected to a wide range of drying times, drying temperatures, and drying pressures. For example, the drying time can range from about 15 min to about 48 hours, from about 30 min to about 24 hours, or from about 1 to about 12 hours, and the drying temperature can range from about 50° C. to about 300° C., from about 95° C. to about 300° C., or from about 100° C. to about 275° C. The drying pressure can be at or around atmospheric pressure, but in many instances, the drying step can be conducted under vacuum conditions at any suitable sub-atmospheric pressure, such as less than 100 torr (13.3 kPa), less than 50 (6.67 kPa) torr, or less than 10 torr (1.33 kPa).

Various types of dryer devices can be used for the drying step, such as tray dryers, rotary dryers, fluidized bed dryers, and spray dryers, although not limited thereto. Likewise, the flow of the drying medium (gas flow) relative to the fluorided solid oxide is not particularly limited, and encompasses concurrent flow, countercurrent flow, and flow through (e.g., such as in a fluidized bed).

In some aspects of this invention, the drying step can comprise spray drying the fluorided solid oxide. Generally, spray drying can be used to transform the wet fluorided solid oxide (e.g., a slurry or suspension of the fluorided solid oxide in water) to a dried particulate or powder form by spraying a feed stream containing the wet fluorided solid oxide into a device containing a hot drying gas (usually air), in which the residual water evaporates from the fluorided solid oxide.

In the spray drying process, the feed stream can be sprayed into a drying chamber in the form of droplets, and contacted with a large volume of a hot gas, which directly contacts the wet solid oxide. Typical gas inlet temperatures range from 95° C. to about 800° C., or from about 100° C. to about 500° C., but are not limited thereto. The flow of the gas relative to the flow of the solid into the spray dryer can be concurrent flow, countercurrent flow, or mixed flow. After drying, the gas stream and the dried fluorided solid oxide are separated. If needed, fines can be removed in filter collectors or cyclones. The dried fluorided solid oxide can have the form of free-flowing particulate solids.

The initial feed into the spray dryer can be subjected to an atomization process, which can employ, for instance, a high-pressure nozzle, a two-fluid nozzle, or a high-speed centrifugal disk. High-pressure nozzles result in atomization by forcing the solid support slurry under high pressure through a small nozzle orifice, the size of which can depend on the desired pressure and particle size of the solids in the slurry, among other factors. Wear on the nozzle orifice and plugging can result during long-term operation; therefore, regular maintenance can be beneficial to ensure proper atomization. Two-fluid nozzles have the advantage of a relatively low operating pressure, and often can be used when the feed stream is a thick or high-solids slurry, which does not work well in high-pressure nozzle systems. The atomizing fluid can be steam or air.

High-speed centrifugal disks atomize the fluorided solid oxide slurry by contacting the slurry with a rapidly rotating disk. Disk diameter and disk speed (e.g., 3,000 rpm and above) can be varied to produce a suitable droplet size for drying. Beneficially, disk atomization is not subject to wear and plugging, as in the nozzle systems. Disk rotation can be driven by any suitable motor or technique.

Regardless of the atomization process, the spray drying process can be configured to maintain the spherical nature of the fluorided solid oxide. The average particle size of the solid material can be maintained in many instances, and generally, the average particle size depends upon the atomization process, the solids content of the solid oxide feed stream, feed stream viscosity, and feed rate, among other factors. Likewise, bulk density of the dried fluorided solid oxide can be controlled based on operating conditions of the spray dryer, such as droplet size, inlet gas temperature, and air turbulence, among other factors.

Mixing of the gas stream (e.g., air) and the droplet in the drying chamber can be accomplished, for example, using concurrent flow of gas and solids (e.g., horizontal or vertical spray dryers), or countercurrent flow of gas and solids. In the latter case, upward air flow can carry fines to the top of the chamber for easy removal. Mixed flow spray dryers combine countercurrent and concurrent drying, with complex flow patterns and high turbulence for efficient heat and mass transfer.

A benefit to spray drying can be the short contact time of the fluorided solid oxide to elevated temperatures in the drying chamber. Thus, in addition to average particle size, the spray drying process can be configured to produce dried fluorided solid oxides that have surface areas and pore volumes that are comparable to the starting material (i.e., prior to spray drying).

Optionally, after drying, the fluorided solid oxide can be calcined (to produce a calcined fluorided solid oxide), which can be conducted at a variety of temperatures and time periods. Typical peak calcining temperatures often fall within a range from about 400° C. to about 1000° C., such as from about 400° C. to about 900° C., from about 500° C. to about 800° C., or from about 550° C. to about 700° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges.

The duration of the calcining step is not limited to any particular period of time. Hence, the calcining step can be conducted, for example, in a time period ranging from as little as 30-45 minutes to as long as 36-48 hours, or more. The appropriate calcining time can depend upon, for example, the initial/peak calcining temperature, among other variables. Generally, however, the calcining step can be conducted in a time period that can be in a range from about 30 minutes to about 48 hours, such as, for example, from about 1 hour to about 24 hours, from about 1 hour to about 12 hours, from about 2 hours to about 12 hours, or from about 2 hours to about 8 hours.

The calcining step can be conducted in a calcining gas stream that comprises (or consists essentially of, or consists of) an inert gas (e.g., nitrogen), oxygen, air, or any mixture or combination thereof. In some aspects, the calcining gas stream can comprise air, while in other aspects, the calcining gas stream can comprise a mixture of air and nitrogen. Yet, in certain aspects, the calcining gas stream can be an inert gas, such as nitrogen and/or argon.

The calcining step can be conducted using any suitable technique and equipment, whether batch or continuous. For instance, the calcining step can be performed in a belt calciner or, alternatively, a rotary calciner. In some aspects, the calcining step can be performed in a batch or continuous calcination vessel comprising a fluidized bed. As would be recognized by those of skill in the art, other suitable techniques and equipment can be employed for the calcining step, and such techniques and equipment are encompassed herein.

Catalyst Compositions

In some aspects, the present invention employs catalyst compositions comprising a metallocene compound and a fluorided solid oxide activator. These catalyst compositions can be utilized to produce polyolefins—homopolymers, copolymers, and the like—for a variety of end-use applications. In aspects of the present invention, it is contemplated that the catalyst composition can contain more than one metallocene compound (two or more metallocene compounds). Further, more than one fluorided solid oxide activator also can be utilized.

Generally, catalyst compositions of the present invention comprise a metallocene compound and a fluorided solid oxide. Optionally, such catalyst compositions can further comprise one or more than one co-catalyst compound or compounds (suitable co-catalysts, such as organoaluminum compounds, also are discussed herein). Thus, a catalyst composition of this invention can comprise a metallocene compound, a fluorided solid oxide, and an organoaluminum compound. For instance, the fluorided solid oxide can comprise (or consist essentially of, or consist of) fluorided alumina, fluorided silica-alumina, fluorided silica-zirconia, fluorided silica-titania, fluorided silica-coated alumina, and the like, or combinations thereof. Additionally, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Accordingly, a catalyst composition consistent with aspects of the invention can comprise (or consist essentially of, or consist of) a metallocene compound; fluorided alumina (or fluorided silica-alumina, or fluorided silica-coated alumina); and triethylaluminum (or triisobutylaluminum).

In another aspect of the present invention, a catalyst composition is provided which comprises a metallocene compound, a fluorided solid oxide, and an organoaluminum compound, wherein this catalyst composition is substantially free of aluminoxanes, organoboron or organoborate compounds, ionizing ionic compounds, or combinations thereof; alternatively, substantially free of aluminoxanes; alternatively, substantially free or organoboron or organoborate compounds; or alternatively, substantially free of ionizing ionic compounds. In these aspects, the catalyst composition has catalyst activity, discussed below, in the absence of these additional materials. For example, a catalyst composition of the present invention can consist essentially of a metallocene compound, a fluorided solid oxide, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these activators/co-catalysts can be employed. For example, a catalyst composition comprising a metallocene complex and a fluorided solid oxide can further comprise a co-catalyst. Suitable co-catalysts in this aspect can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof; or alternatively, organoaluminum compounds, organozinc compounds, organomagnesium compounds, organolithium compounds, or any combination thereof. More than one co-catalyst can be present in the catalyst composition.

Any suitable metallocene compound can be used in the catalyst composition. For example, the metallocene component of the catalyst systems provided herein can, in some aspects, comprise an unbridged metallocene; alternatively, an unbridged zirconium or hafnium based metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. These cyclopentadienyl groups and indenyl groups, independently, can be unsubstituted or can be substituted with any suitable substituent (one or more than one). Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047, the disclosures of which are incorporated herein by reference in their entirety.

In other aspects, the metallocene component of the catalyst compositions provided herein can comprise a bridged metallocene compound, e.g., with titanium, zirconium, or hafnium, such as a bridged zirconium or hafnium based metallocene compound with a fluorenyl group; or alternatively, a bridged zirconium or hafnium based metallocene compound with a cyclopentadienyl group and a fluorenyl group. These cyclopentadienyl groups and fluorenyl groups, independently, can be unsubstituted or can be substituted with any suitable substituent (one or more than one). For instance, such bridged metallocenes can contain an alkenyl substituent (e.g., a terminal alkenyl) on the bridging group, on a cyclopentadienyl-type group (e.g., a cyclopentadienyl group or a fluorenyl group), or on the bridging group and the cyclopentadienyl-type group. In some aspects, the metallocene catalyst component can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group, on a cyclopentadienyl-type group, or on both the bridging group and the cyclopentadienyl group. Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047, the disclosures of which are incorporated herein by reference in their entirety.

The catalyst composition can be produced in any manner, such as by contacting the metallocene compound, the fluorided solid oxide, and the co-catalyst (if used) in any order.

Generally, the weight ratio of co-catalyst (e.g., an organoaluminum compound) to fluorided solid oxide can be in a range from about 10:1 to about 1:1000. If more than one co-catalyst compound and/or more than one fluorided solid oxide are employed, this ratio is based on the total weight of each respective component. In another aspect, the weight ratio of the co-catalyst to the fluorided solid oxide can be in a range from about 3:1 to about 1:500, or from about 1:10 to about 1:350.

In some aspects of this invention, the weight ratio of metallocene complex to the activator (fluorided solid oxide) can be in a range from about 1:1 to about 1:1,000,000. If more than one metallocene compound and/or more than one fluorided solid oxide is/are employed, this ratio is based on the total weights of the respective components. In another aspect, this weight ratio can be in a range from about 1:5 to about 1:100,000, or from about 1:10 to about 1:10,000. Yet, in another aspect, the weight ratio of the metallocene to the fluorided solid oxide can be in a range from about 1:20 to about 1:1000.

Catalyst compositions of the present invention generally have a catalyst activity greater than about 1,000 grams, greater than about 2,000 grams, greater than about 3,000 grams, greater than about 4,000 grams, etc., of ethylene polymer (homopolymer or copolymer, as the context requires) per gram of the fluorided solid oxide per hour (abbreviated g/g/h). In another aspect, the catalyst activity can be greater than about 6,000, greater than about 8,000, or greater than about 10,000 g/g/h, and often can range up to 13,000-18,000 g/g/h. These activities are measured under slurry polymerization conditions, with a triisobutylaluminum co-catalyst, using isobutane as the diluent, at a polymerization temperature of 95° C. and a reactor pressure of 400 psig. Additionally, an excess of metallocene compound (1-(methyl)-1-(3-butenyl)-1-(cyclopentadienyl)-1-(2,7-di-tert-butylfluorenyl) methane zirconium dichloride) can be used, and the fluorided solid oxide can comprise fluorided silica-coated alumina, although not limited thereto.

Co-Catalysts

In certain aspects directed to catalyst compositions containing a co-catalyst and polymerization processes using a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (or non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects directed to catalyst compositions containing a co-catalyst and polymerization processes using a co-catalyst, the co-catalyst can comprise an aluminoxane compound (e.g., a supported aluminoxane), an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoboron/organoborate compounds include N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, tris (pentafluorophenyl)boron, tris[3,5-bis(trifluoromethyl)phenyl]boron, and the like, or mixtures thereof.

Examples of ionizing ionic compounds can include, but are not limited to, the following compounds: tri(n-butyl) ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl)

borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl) borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl)aluminate, potassium tetrafluoroaluminate, and the like, or combinations thereof.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Polymerization Processes

Catalyst compositions of the present invention can be used to polymerize olefins to form homopolymers, copolymers, terpolymers, and the like, and are discussed herein. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise a metallocene compound, a fluorided solid oxide, and an optional co-catalyst. Suitable metallocene complexes, fluorided solid oxide activators, and co-catalysts are discussed herein. Hence, aspects of this invention are directed to a process for polymerizing olefins in the presence of a catalyst composition, the process comprising contacting a catalyst composition with ethylene and optionally an olefin comonomer (one or more) under polymerization conditions to produce an ethylene polymer. Likewise, the present invention encompasses olefin polymerization processes that comprise any of the processes to produce a fluorided solid oxide disclosed herein (e.g., comprising (a) contacting an acidic fluorine-containing compound and an inorganic base to produce an aqueous mixture having a pH of at least about 4, and (b) contacting a solid oxide with the aqueous mixture to produce the fluorided solid oxide; or comprising (A) contacting an acidic fluorine-containing compound with a solid oxide to produce a mixture, and (B) contacting the mixture with a inorganic base to produce the fluorided solid oxide at a pH of at least about 4), contacting a metallocene compound, the fluorided solid oxide, and an optional co-catalyst to form a catalyst composition, and contacting the catalyst composition with an olefin monomer and optionally an olefin comonomer (one or more) in a polymerization reactor system under polymerization conditions to produce an olefin polymer The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a loop reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge.

Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 35° C. to about 280° C., for example, or from about 50° C. to about 175° C., depending upon the type of polymerization reactor(s). In some reactor systems, the polymerization temperature generally can fall within a range from about 60° C. to about 120° C., or from about 70° C. to about 100° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). The pressure for gas phase polymerization is usually at about 200 to 500 psig (1.4 MPa to 3.4 MPa). High pressure polymerization in tubular or autoclave reactors is generally conducted at about 20,000 to 75,000 psig (138 to 517 MPa). Polymerization reactors can also be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

Aspects of this invention are directed to olefin polymerization processes conducted in the absence of added hydrogen. An olefin polymerization process of this invention can comprise contacting a catalyst composition with an olefin monomer and optionally an olefin comonomer in a polymerization reactor system under polymerization conditions to produce an olefin polymer, wherein the catalyst composition can comprise a metallocene compound, a fluorided solid oxide, and an optional co-catalyst, and wherein the polymerization process is conducted in the absence of added hydrogen (no hydrogen is added to the polymerization reactor system). As one of ordinary skill in the art would recognize, hydrogen can be generated in-situ by catalyst compositions in various olefin polymerization processes, and the amount generated can vary depending upon the specific catalyst composition and metallocene compound employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition with an olefin monomer and optionally an olefin comonomer in a polymerization reactor system under polymerization conditions to produce an olefin polymer, wherein the catalyst composition can comprise a metallocene compound, a fluorided solid oxide, and an optional co-catalyst, and wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers (e.g., ethylene/α-olefin copolymers, ethylene homopolymers, etc.) produced by any of the polymerization processes disclosed herein. Articles of manufacture can be formed from, and/or can comprise, the polymers produced in accordance with this invention.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Polymers and Articles

Olefin polymers encompassed herein can include any polymer produced from any olefin monomer and comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can be (or can comprise) an ethylene homopolymer, an ethylene/1-butene copolymer, an ethylene/1-hexene copolymer, and/or an ethylene/1-octene copolymer; or alternatively, an ethylene/1-hexene copolymer. In another aspect, the olefin polymer can be (or can comprise) a polypropylene homopolymer or a propylene-based copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the ethylene polymers of this invention, whose typical properties are provided below.

Generally, the density of the ethylene polymer (e.g., ethylene homopolymer and/or ethylene/α-olefin copolymer, such as an ethylene/1-butene copolymer, an ethylene/1-hexene copolymer, or an ethylene/1-octene copolymer) can range from about 0.87 to about 0.96 g/cm$^3$. In one aspect of this invention, the density of the ethylene polymer can be in a range from about 0.89 to about 0.96, or from about 0.87 to about 0.94 g/cm$^3$. Yet, in another aspect, the density can be in a range from about 0.90 to about 0.96 g/cm$^3$, such as, for example, from about 0.91 to about 0.96 g/cm$^3$, from about 0.91 to about 0.95 g/cm$^3$, or from about 0.91 to about 0.94 g/cm$^3$.

Suitable non-limiting ranges for the melt index (MI) of the ethylene polymer can include a MI less than or equal to about 25, less than or equal to about 10, less than or equal to about 5, or less than or equal to about 2 g/10 min. In some aspects, the ethylene polymer can have a MI in a range from 0 to about 25, from about 0.1 to about 10, from about 0.25 to about 5, from about 0.5 to about 3, or from about 0.5 to about 2 g/10 min.

While not limited thereto, the ethylene polymer can have a number-average molecular weight (Mn) in a range from about 5,000 to about 150,000, from about 5,000 to about 50,000, from about 10,000 to about 100,000, or from about 15,000 to about 75,000 g/mol. Additionally or alternatively, the ethylene polymer can have a weight-average molecular weight (Mw) in a range from about 50,000 to about 700,000, from about 60,000 to about 600,000, from about 75,000 to about 500,000, or from about 100,000 to about 400,000 g/mol.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Also contemplated herein is a method for forming or preparing an article of manufacture that comprises a polymer produced by any of the polymerization processes disclosed herein. For instance, the method can comprise (i) contacting a catalyst composition with an olefin monomer and an optional olefin comonomer under polymerization conditions in a polymerization reactor system to produce an olefin polymer, wherein the catalyst composition can comprise a metallocene compound, a fluorided solid oxide activator, and an optional co-catalyst (e.g., an organoaluminum compound); and (ii) forming an article of manufacture comprising the olefin polymer. The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

Melt index (MI, g/10 min) can be determined in accordance with ASTM D1238 at 190° C. with a 2,160 gram weight, and high load melt index (HLMI, g/10 min) can be determined in accordance with ASTM D1238 at 190° C. with a 21,600 gram weight. Density can be determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions can be obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) is set at 1 mL/min, and polymer solution concentrations are in the range of 1.0-1.5 mg/mL, depending on the molecular weight. Sample preparation is conducted at 150° C. for nominally 4 hr with occasional and gentle agitation, before the solutions are transferred to sample vials for injection. An injection volume of about 200 µL is used. The integral calibration method is used to deduce molecular weights and molecular weight distributions using Chevron Phillips Chemical Company's HDPE polyethylene resin, MARLEX®BHB5003, as the standard. The integral table of the standard can be predetermined in a separate experiment with SEC-MALS. Mn is the number-average molecular weight, Mw is the weight-average molecular weight, and Mz is the z-average molecular weight.

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity |η*|versus frequency (co) data were then curve fitted using the modified three parameter Carreau-Yasuda (CY) empirical model to obtain the zero shear viscosity—η$_0$, characteristic viscous relaxation time—τ$_\eta$, and the breadth parameter—a (CY-a parameter). The simplified Carreau-Yasuda (CY) empirical model is as follows.

$$|\eta*(\omega)| = \frac{\eta_0}{[1+(\tau_\eta\omega)^a]^{(1-n)/a}},$$

wherein:

$|\eta*(\omega)|$ = magnitude of complex shear viscosity;

$\eta_0$ = zero shear viscosity;

$\tau_\eta$ = viscous relaxation time (Tau($\eta$) in sec);

$a$ = "breadth" parameter (CY-$a$ parameter);

$n$ = fixes the final power law slope, fixed at 2/11; and $\omega$ = angular frequency of oscillatory shearing deformation.

Details of the significance and interpretation of the CY model and derived parameters can be found in: C. A. Hieber and H. H. Chiang, Rheol. Acta, 28, 321 (1989); C. A. Hieber and H. H. Chiang, Polym. Eng. Sci., 32, 931 (1992); and R. B. Bird, R. C. Armstrong and O. Hasseger, Dynamics of Polymeric Liquids, Volume 1, Fluid Mechanics, 2nd Edition, John Wiley & Sons (1987); each of which is incorporated herein by reference in its entirety.

The d50 particle size, or median or average particle size, refers to the particle size for which 50% of the sample has a smaller size and 50% of the sample has a larger size. Particle size distribution (inclusive of d10, d50, and d90) was determined using laser diffraction in accordance with ISO 13320.

BET surface areas disclosed herein were determined using the BET nitrogen adsorption method of Brunaur et al., J. Am. Chem. Soc., 60, 309 (1938). Total pore volumes were determined in accordance with Halsey, G. D., J. Chem. Phys. (1948), 16, pp. 931.

Examples A1-A2

Fluorided Solid Oxide Preparation.

For Example A1, a fluorided solid oxide was produced using HBF$_4$, and for Example A2, a fluorided solid oxide was produced using H$_2$SiF$_6$. ZnO was used as the inorganic base, and the solid oxide was silica-coated alumina (Siral® 40), which contains 40 wt. % silica and 60 wt. % alumina. Recipe calculations for (A1) tetrafluoroboric acid (HBF$_4$) and (A2) hexafluorosilicic acid (H$_2$SiF$_6$) are shown in Table I for 5 wt. % F, or 5 grams of F per 100 grams (dry weight) of the solid oxide. Approximately 1.25 equivalents of ZnO were used for each equivalent of acid, and after addition of the solid oxide, the percent solids in the aqueous mixture was 20 wt. %.

For these examples, water was first charged to the vessel, followed by the acidic fluorine-containing compound, and then the ZnO, and stirring until dissolution, which took approximately 10 minutes. If desired, an acid-base indicator (e.g., methyl orange) can be added to confirm that enough ZnO has been added to reach a generally neutral pH, in this case, a pH value of approximately 4.5. Depending upon the particular conditions, not all of the ZnO may dissolve. After addition of the ZnO was complete, the solid oxide was added and mixed for 30 minutes at 25° C. to form an aqueous slurry. Subsequently, the fluorided solid oxides were spray dried.

TABLE I

Fluorided Solid Oxide Preparation.

| | Example | |
|---|---|---|
| | A1 | A2 |
| Silica-coated alumina, dry wt, g | 100 | 100 |
| Weight loss measured (dry/wet) | 0.95 | 0.95 |
| Silica-alumina wet weight, g | 105.3 | 105.3 |
| Solids target | 20% | 20% |
| Water needed, g | 500 | 500 |
| Fluoride acid source | $HBF_4$ | $H_2SiF_6$ |
| Fluoride % target | 5% | 5% |
| Fluoride target, g F | 5 | 5 |
| MW of fluoride source | 88 | 144 |
| % Fluoride in source | 86.4% | 79.2% |
| F acid needed, g | 5.79 | 6.32 |
| Concentration of acid source | 48% | 22.5% |
| g of acid solution needed | 12.1 | 28.1 |
| Density of acid solution | 1.4 | 1.22 |
| mL of acid solution needed | 8.6 | 23.0 |
| Acid equivalents used | 0.0658 | 0.0877 |
| Excess ZnO targeted | 1.25 | 1.25 |
| Zinc oxide equivalents needed | 0.0822 | 0.1096 |
| Moles Zinc oxide needed | 0.0411 | 0.0548 |
| MW of Zinc oxide | 81 | 81 |
| g Zinc oxide needed | 3.33 | 4.44 |
| mmol Zn/g Silica-alumina | 0.41 | 0.55 |

Examples A3-A4

Fluorided Solid Oxide Preparation with an Additional Metal.

Example A3 is the fluorided solid oxide of Example A1 with additional zinc impregnation, and Example A4 is the fluorided solid oxide of Example A2 with additional zinc impregnation. The protocol used to prepare Examples A3-A4 was the same as for Examples A1-A2, except in Examples A3-A4, after the ZnO addition was complete, an additional amount of zinc acetate was added, for a total amount of Zn of about 1 mmol/g of the solid oxide, as shown in Table II.

TABLE II

Fluorided Solid Oxide Preparation With Additional Metal.

| | Example | |
|---|---|---|
| | A3 | A4 |
| Zinc oxide moles added | 0.0411 | 0.0548 |
| Addition X Zn to add as acetate | 1.50 | 1.00 |
| Zinc acetate moles to add | 0.0617 | 0.0548 |
| MW of $Zn(OAc)_2$ | 183.48 | 183.48 |
| g Zinc acetate to add | 11.32 | 10.06 |
| Total mmol Zn/g Silica-coated alumina | 1.028 | 1.096 |

Examples 1-15 and C1-C6

Polymerization Experiments with Fluorided Solid Oxides.

For Examples 1-14 and C1-C5, the general procedure for the polymerization experiments was as follows. The polymerization experiments are summarized in Table III, and were conducted in a 2.2-L autoclave reactor, with isobutane (1.2 L) used in all experiments. The fluorided solid oxide, TIBA solution, and 3 mg of the metallocene compound (which was 1-(methyl)-1-(3-butenyl)-1-(cyclopentadienyl)-1-(2,7-di-tert-butylfluorenyl) methane zirconium dichloride, a bridged cyclopentadienyl-fluorenyl metallocene compound with a carbon bridge substituted with a methyl and a terminal butenyl) were charged to the reactor, followed by isobutane addition. Excess metallocene was utilized, so that the activity of the fluorided solid oxide could be evaluated. The contents of the reactor were stirred and heated to the desired polymerization temperature of 95° C. Ethylene was then introduced into the reactor (no hydrogen or comonomer was added), and ethylene was fed on demand to maintain the target pressure of 400 psig for the desired reaction time. The reactor was maintained at 95° C. throughout the run by an automated heating-cooling system. After venting of the reactor, purging, and cooling, the resulting polymer product was dried under reduced pressure. For Examples 15 and C16, a 4-L steel reactor was used with 2 L of isobutane, but only 1 mg of the metallocene compound was used.

Fluorided solid oxides for Examples 1-15 were prepared as generally described in Examples A1-A4, except that the ZnO was combined first with the water, followed by addition of the acidic fluorine-containing compound, which was neutralized by the ZnO (to a pH in the 4-5 range). Most, if not all, of the ZnO was dissolved. For Examples 3-4, additional zinc acetate was added to the aqueous mixture. Then, the silica-coated alumina (40 wt. % silica) was added and mixed for 30 minutes at 25° C., followed by spray drying at approximately 100° C. After drying, the catalyst was calcined for 3 hr in air at the respective peak calcination temperature shown in Table III.

FIG. 1 depicts the particle size distribution of the fluorided solid oxide product of Example 15, and in sum, the fluorided solid oxide (fluorided silica-coated alumina) product had a d10 of 17 μm, a d50 of 49 μm, and a d90 of 78 μm.

Figure 2:
FIG. 2 presents a scanning electron micrograph of the fluorided solid oxide of Example 15.

FIG. 2 is a scanning electron micrograph of the fluorided solid oxide of Example 15. As shown in FIG. 2, both fluorine and zinc are well distributed on the surface of the fluorided solid oxide, demonstrating homogeneous distribution and efficient use of both fluorine and zinc components in the production of the fluorided solid oxide.

The fluorided solid oxides for control Examples C1-C3 were produced by contacting the silica-coated alumina with an acidic solution of HF, allowing the fluorine to absorb onto the solid oxide, and then spray drying in a commercial spray dryer. The d50 particle size was 37 μm.

The fluorided solid oxides for control Examples C4-C6 were produced by impregnating silica-coated alumina with an ammonium bifluoride solution (C4 and C6) or a $HBF_4$ solution (C5) in methanol (no inorganic base addition), drying, and then calcining for 3 hr, as shown in Table III. Examples C4-C5 were spray dried, while C6 was oven dried.

For the fluorided solid oxide preparation, Table III summarizes the spray drying and calcination conditions, the fluorine compound used and amount (mmol per gram of the solid oxide), the amount of ZnO, the amount of Zinc acetate (if used), and the fluorided silica-coated alumina surface area (SA) and total pore volume (PV). For the polymerization experiments, Table III summarizes the amount of TIBA (triisobutylaluminum) co-catalyst, the amount of the fluorided silica-coated alumina (FSCA), the amount of polyethylene produced (g), the reaction time (min), the catalyst yield (grams of PE per gram of FSCA), and the catalyst activity (grams of PE per gram of FSCA per hr).

Examples C1-C3 demonstrate the typical catalyst activity—an average of 8,600 g/g/hr—when using the standard FSCA produced using HF. Using fluorided solid oxides produced as described herein, Examples 1-14 utilized laboratory spray drying, and the data appears to indicate that a slightly higher calcination temperature of 650° C. results in higher catalyst activity, unlike the standard 600° C. used for C1-C3. Importantly, the examples that were calcined at 650° C. showed comparable, if not superior, activity—an average of 9,900 g/g/hr—to that of Examples C1-C3.

To determine the impact of the ZnO (inorganic base) on the catalyst activity, Examples C4-C5 were produced using a standard ammonium bifluoride as the fluoride source, and with a HBF$_4$ fluoride source (as in Examples 1-14), but both without zinc addition. While the main intent of the inorganic base addition is not related to catalyst activity, it appears that the addition of ZnO resulted in a slight increase in catalyst activity.

Example 15 was a larger scale evaluation of FSCA, with both spray drying and calcining in pilot plant facilities, and was tested under different polymerization conditions, which led a lower catalyst activity than in the Examples 1-14. Example C6 provides a control catalyst run under these same conditions, which shows that the catalyst activity of Example 15 is much higher.

In sum, these examples indicate that the described processes for making fluorided solid oxides result in an activator that is comparable, if not superior, to standard fluorided solid oxide activators produced by other processes. Beneficially, however, these fluorided solid oxide can be produced at a relatively neutral pH (>4) without the emission of potentially hazardous and corrosive hydrogen fluoride fumes.

TABLE III

Summary of Examples 1-15 and C1-C6

| Example | Spray Dried at 100° C. | Calcination (air, 3 hr, lab) | Fluorine Compound | Fluorine Compound (mmol/g) | ZnO (mmol/g) | Zinc Acetate (mmol/g) | 1M TIBA Solution |
|---|---|---|---|---|---|---|---|
| C1 | Commercial | 600° C. | HF | 2.632 | 0 | 0 | 0.5 mL |
| C2 | Commercial | 600° C. | HF | 2.632 | 0 | 0 | 0.5 mL |
| C3 | Commercial | 600° C. | HF | 2.632 | 0 | 0 | 0.5 mL |
| 1 | Lab-batch | 600° C. | HBF$_4$ | 0.658 | 0.411 | 0 | 0.5 mL |
| 2 | Lab-batch | 650° C. | HBF$_4$ | 0.658 | 0.411 | 0 | 0.5 mL |
| 3 | Lab-batch | 600° C. | HBF$_4$ | 0.658 | 0.411 | 0.589 | 0.5 mL |
| 4 | Lab-batch | 650° C. | HBF$_4$ | 0.658 | 0.411 | 0.589 | 0.5 mL |
| 5 | Lab-batch | 600° C. | HBF$_4$ | 0.658 | 0.411 | 0 | 0.5 mL |
| 6 | Lab-batch | 600° C. | HBF$_4$ | 0.658 | 0.411 | 0 | 0.5 mL |
| 7 | Lab-batch | 600° C. | HBF$_4$ | 0.658 | 0.411 | 0 | 0.5 mL |
| 8 | Lab-batch | 650° C. | HBF$_4$ | 0.658 | 0.411 | 0 | 0.5 mL |
| 9 | Lab-batch | 300° C. | HBF$_4$ | 0.658 | 0.411 | 0 | 0.5 mL |
| 10 | Lab-batch | 600° C. | HBF$_4$ | 0.658 | 0.411 | 0 | 0.5 mL |
| 11 | Lab-batch | 650° C. | HBF$_4$ | 0.658 | 0.411 | 0 | 0.5 mL |
| 12 | Lab-batch | 650° C. | HBF$_4$ | 0.658 | 0.411 | 0 | 0.5 mL |
| 13 | Lab-batch | 600° C. | HBF$_4$ | 0.658 | 0.411 | 0 | 0.5 mL |
| 14 | Lab-batch | 650° C. | HBF$_4$ | 0.658 | 0.411 | 0 | 0.5 mL |
| C4 | Lab | 650° C. | NH$_4$HF$_2$ | 0.368 | 0 | 0 | 0.5 mL |
| C5 | Lab | 650° C. | HBF$_4$ | 0.658 | 0 | 0 | 0.5 mL |
| 15 | Pilot plant | Pilot-600° C. | HBF$_4$ | 0.658 | 0.411 | 0 | 0.4 mL |
| C6 | Lab-Oven dried | 600° C. | NH$_4$HF$_2$ | 0.368 | 0 | 0 | 0.4 mL |

| Example | FSCA (g) | PE Yield (g) | Time (min) | Yield (g/g) | Activity (g/g/hr) | SA (m$^2$/g) | PV (mL/g) |
|---|---|---|---|---|---|---|---|
| C1 | 0.0430 | 179 | 26 | 4163 | 9606 | | |
| C2 | 0.0295 | 136 | 30 | 4610 | 9220 | | |
| C3 | 0.0497 | 210 | 36 | 4225 | 7042 | | |
| 1 | 0.0267 | 107 | 30 | 4007 | 8015 | 392 | 0.961 |
| 2 | 0.0287 | 129 | 31 | 4495 | 8700 | | |
| 3 | 0.0411 | 92 | 17 | 2238 | 7900 | 314 | 0.908 |
| 4 | 0.0336 | 177 | 32 | 5268 | 9877 | | |
| 5 | 0.0335 | 135 | 37 | 4030 | 6535 | 386 | 0.932 |
| 6 | 0.0297 | 97 | 33 | 3266 | 5938 | | |
| 7 | 0.0488 | 163 | 30 | 3340 | 6680 | | |
| 8 | 0.0280 | 150 | 43 | 5357 | 7475 | | |
| 9 | 0.0423 | 39 | 63 | 922 | 878 | | |
| 10 | 0.0104 | 52 | 35 | 5000 | 8571 | | |
| 11 | 0.0138 | 108 | 34 | 7826 | 13811 | | |
| 12 | 0.0339 | 168 | 29 | 4956 | 10253 | | |
| 13 | 0.0291 | 151 | 35 | 5189 | 8895 | 343 | 0.923 |
| 14 | 0.0210 | 122 | 36 | 5810 | 9683 | | |
| C4 | 0.0305 | 136 | 28 | 4459 | 9555 | 366 | 0.988 |
| C5 | 0.0161 | 78 | 32 | 4845 | 9084 | | |
| 15 | 0.0300 | 97 | 30 | 3233 | 6467 | | |
| C6 | 0.0300 | 52 | 30 | 1733 | 3467 | | |

Examples 16-23

Fluorided Solid Oxide Preparation with a Sodium Base.

Silica-coated alumina (Siral® 40) was impregnated with hydrofluoric acid to equal 5 wt. % F, and sodium carbonate was added aqueously to neutralize the acid, in an amount to equal the sodium level shown in Table IV. Sodium was added to neutralize the acidity during the fluorided silica-coated alumina (FSCA) preparation. These FSCA supports were then calcined in air at 600° C. for three hours, cooled to room temperature, and flushed with dry nitrogen for 30 minutes. A 100 mg sample of each FSCA was introduced into a 4-L stainless steel autoclave, along with 0.4 mL of tri-isobutyl aluminum (TIBA) and 0.2 mg of a bridged metallocene compound (1-(methyl)-1-(3-butenyl)-1-(cyclopentadienyl)-1-(2,7-di-tert-butylfluorenyl) methane zirconium dichloride, a bridged cyclopentadienyl-fluorenyl metallocene compound with a carbon bridge substituted with a methyl and a terminal butenyl). Two liters of isobutane liquid were then added, and the temperature of the reactor was raised to 90° C. and maintained at that temperature throughout the experiment. Ethylene was added at 390 psig, and it was supplied on demand at that pressure for 30 minutes. After venting of the reactor, purging, and cooling, the resulting polymer product was dried under reduced pressure.

Table IV summarizes the results of Examples 16-23. The activity was computed from the amount of polymer made per gram of FSCA and in the time allocated. The addition of sodium changed the molecular weight and rheological properties of the polymer produced. Although the sodium carbonate lowered the acidity, it also unacceptably lowered the activity of the catalyst as increasing amounts of sodium were added.

Examples 24-30

Fluorided Solid Oxide Preparation with Magnesium.

In Examples 24-30, the same procedure of Examples 16-23 was used, except that magnesium nitrate, rather than a sodium base, was added during preparation of the FSCA. After preparation, the FSCA supports were dried and calcined at 475° C., followed by polymerization experiments identical to Examples 16-23. Table V summarizes the results of Examples 24-30. Unexpectedly, the activity was not affected by the addition of the magnesium nitrate, regardless of the amount added. Further, the polymer molecular weight and rheological properties were not affected.

Examples 31-32

Fluorided Solid Oxide Preparation with Different Magnesium Bases.

For Example 31, 6.9 mL of a solution of 22.5 wt. % $H_2SiF_6$ were added to 30 mL of water, producing an acidic solution having a pH of approximately 1.0. To neutralize the acidity, magnesium carbonate was added, which generated $CO_2$ gas. The addition was continued until the gas generation stopped, which occurred at 2.2 g of $MgCO_3$, which is approximately 2 mol of Mg per mol of $H_2SiF_6$ acid used. The magnesium carbonate addition raised the pH of the resultant mixture to a pH of approximately 5.1. Then, 30 g of the Siral® 40 silica-coated alumina was added to this mixture. After mixing for 5 min, the FSCA was removed, dried in a vacuum oven at 110° C. overnight, and pushed through a 35 mesh screen. A 10-g sample of this powder was then calcined in a fluidized bed at 600° C. for three hours, similar to Examples 16-23. Polymerization experiments identical to Examples 16-23 were then performed, using 100 mg of the FSCA, 0.4 mL of 1M TIBA and 2 mg of the bridged metallocene. For Example 31, three experiments were performed with the FSCA prepared using $MgCO_3$, and unexpectedly high activities were obtained: 7160 g/g/hr, 7600 g/g/hr, and 7740 g/g/hr.

For Example 32, the same procedure of Example 31 was used, except that the same molar amount of Mg was introduced into the hexafluorosilicic acid in the form of magnesium hydroxide. Polymerization conditions were the same. Two experiments were performed with the FSCA prepared using $Mg(OH)_2$, and similar to Example 31, unexpectedly high activities were obtained for Example 32: 6840 g/g/hr and 6400 g/g/hr.

TABLE IV

Summary of Examples 16-23

| Example | Na (wt. %) | Activity (g/g/hr) | Mn (kg/mol) | Mw (kg/mol) | Mz (kg/mol) |
| --- | --- | --- | --- | --- | --- |
| 16 | 0 | 4160 | 150 | 369 | 720 |
| 17 | 0.02 | 3905 | 150 | 371 | 726 |
| 18 | 0.05 | 3285 | 153 | 374 | 724 |
| 19 | 0.10 | 3221 | 150 | 371 | 725 |
| 20 | 0.15 | 2685 | 150 | 368 | 717 |
| 21 | 0.20 | 2431 | 152 | 375 | 734 |
| 22 | 0.25 | 2262 | 151 | 381 | 748 |
| 23 | 0.30 | 1854 | 152 | 384 | 764 |

| Example | $\eta_0$ (Pa-s) | $\tau_\eta$ (sec) | CY-a | MI (g/10 min) | HLMI (g/10 min) | Tan-d @1/sec |
| --- | --- | --- | --- | --- | --- | --- |
| 16 | 261764 | 0.398 | 0.448 | 0.035 | 0.647 | 4.024 |
| 17 | 317233 | 0.484 | 0.458 | 0.029 | 0.520 | 3.811 |
| 18 | 351600 | 0.540 | 0.458 | 0.026 | 0.476 | 3.654 |
| 19 | 416833 | 0.595 | 0.461 | 0.022 | 0.391 | 3.546 |
| 20 | 528850 | 0.847 | 0.478 | 0.017 | 0.297 | 3.209 |
| 21 | 720100 | 0.959 | 0.482 | 0.012 | 0.200 | 3.088 |
| 22 | 849700 | 1.123 | 0.503 | 0.010 | 0.158 | 3.009 |
| 23 | 991800 | 1.510 | 0.521 | 0.008 | 0.137 | 2.743 |

TABLE V

Summary of Examples 24-30

| Example | Mg (wt. %) | Activity (g/g/hr) | Mn (kg/mol) | Mw (kg/mol) | Mz (kg/mol) |
| --- | --- | --- | --- | --- | --- |
| 24 | 0 | 1680 | 160 | 421 | 895 |
| 25 | 0.02 | 1060 | 174 | 461 | 998 |
| 26 | 0.05 | 1700 | 153 | 412 | 874 |
| 27 | 0.10 | 1660 | 150 | 424 | 942 |
| 28 | 0.15 | 1160 | 167 | 464 | 1019 |
| 29 | 0.22 | 1940 | 139 | 406 | 987 |
| 30 | 0.30 | 1260 | 132 | 462 | 1104 |

| Example | $\eta_0$ (Pa-s) | $\tau_\eta$ (sec) | CY-a | MI (g/10 min) | HLMI (g/10 min) | Tan-d @ 0.1/sec |
| --- | --- | --- | --- | --- | --- | --- |
| 24 | 8.39E+05 | 1.40 | 0.474 | 0.011 | 0.193 | 2.63 |
| 25 | 1.39E+06 | 2.10 | 0.464 | 0.006 | 0.115 | 2.24 |
| 26 | 9.34E+05 | 1.29 | 0.463 | 0.009 | 0.166 | 2.67 |
| 27 | 1.09E+06 | 1.55 | 0.433 | 0.009 | 0.162 | 2.39 |
| 28 | 1.31E+06 | 1.91 | 0.470 | 0.007 | 0.118 | 2.34 |
| 29 | 7.09E+06 | 1.19 | 0.448 | 0.013 | 0.253 | 2.67 |
| 30 | 1.47E+06 | 2.17 | 0.447 | 0.006 | 0.115 | 2.17 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process to produce a fluorided solid oxide, the process comprising:
  (a) contacting an acidic fluorine-containing compound and an inorganic base to produce an aqueous mixture having a pH of at least about 4; and
  (b) contacting a solid oxide with the aqueous mixture to produce the fluorided solid oxide.

Aspect 2. The process defined in aspect 1, wherein the acidic fluorine-containing compound and the inorganic base are contacted at any suitable ratio of acid:base equivalents or a ratio of acid:base equivalents in any range disclosed herein, e.g., from about 1.3:1 to about 1:3, from about 1.2:1 to about 1:2, from about 1:1 to about 1:2, from about 1:1.1 to about 1:1.8, etc.

Aspect 3. The process defined in aspect 1 or 2, wherein the aqueous mixture is a solution.

Aspect 4. The process defined in aspect 1 or 2, wherein the aqueous mixture is a slurry.

Aspect 5. The process defined in any one of aspects 1-4, wherein the acidic fluorine-containing compound is contacted first with water, and then the inorganic base, to produce the aqueous mixture in step (a).

Aspect 6. The process defined in any one of aspects 1-4, wherein the inorganic base is contacted first with water, and then the acidic fluorine-containing compound, to produce the aqueous mixture in step (a).

Aspect 7. The process defined in any one of the preceding aspects, wherein a metal-containing compound is contacted with the acidic fluorine-containing compound and the inorganic base in step (a).

Aspect 8. The process defined in aspect 7, wherein the metal-containing compound comprises any suitable organozinc compound or any organozinc compound disclosed herein, e.g., zinc acetate, zinc formate, etc.

Aspect 9. The process defined in aspect 7 or 8, wherein the fluorided solid oxide contains any suitable amount of the metal of the metal-containing compound (e.g., zinc) or an amount of the metal of the metal-containing compound (e.g., zinc) in any range disclosed herein, e.g., from about 0.5 to about 10 wt. % metal, from about 1 to about 8 wt. % metal, from about 1 to about 4 wt. % metal, etc., based on the weight of the fluorided solid oxide.

Aspect 10. A process to produce a fluorided solid oxide, the process comprising:
(A) contacting an acidic fluorine-containing compound with a solid oxide to produce a mixture; and
(B) contacting the mixture with an inorganic base to produce the fluorided solid oxide at a pH of at least about 4.

Aspect 11. The process defined in aspect 10, wherein the process comprises any suitable ratio of acid:base equivalents of the acidic fluorine-containing compound and the inorganic base or a ratio of acid:base equivalents in any range disclosed herein, e.g., from about 1.3:1 to about 1:3, from about 1.2:1 to about 1:2, from about 1:1 to about 1:2, from about 1:1.1 to about 1:1.8, etc.

Aspect 12. The process defined in aspect 10 or 11, wherein a metal-containing compound is contacted with the mixture and the inorganic base in step (B).

Aspect 13. The process defined in aspect 12, wherein the metal-containing compound comprises any suitable organozinc compound or any organozinc compound disclosed herein, e.g., zinc acetate, zinc formate, etc.

Aspect 14. The process defined in aspect 12 or 13, wherein the fluorided solid oxide contains any suitable amount of the metal of the metal-containing compound (e.g., zinc) or an amount of the metal of the metal-containing compound (e.g., zinc) in any range disclosed herein, e.g., from about 0.5 to about 10 wt. % metal, from about 1 to about 8 wt. % metal, from about 1 to about 4 wt. % metal, etc., based on the weight of the fluorided solid oxide.

Aspect 15. The process defined in any one of the preceding aspects, wherein the acidic fluorine-containing compound comprises any suitable acidic fluorine-containing compound or any acidic fluorine-containing compound disclosed herein, e.g., hydrogen fluoride (HF), ammonium bifluoride ($NH_4HF_2$), triflic acid ($CF_3SO_3H$), tetrafluoroboric acid ($HBF_4$), hexafluorosilicic acid ($H_2SiF_6$), hexafluorophosphoric acid ($HPF_6$), etc., or any combination thereof.

Aspect 16. The process defined in any one of the preceding aspects, wherein the acidic fluorine-containing compound comprises tetrafluoroboric acid ($HBF_4$), hexafluorosilicic acid ($H_2SiF_6$), or both.

Aspect 17. The process defined in any one of the preceding aspects, wherein the inorganic base comprises any suitable inorganic base or any inorganic base disclosed herein, e.g., a zinc-containing inorganic base, an aluminum-containing inorganic base, an iron-containing inorganic base, a manganese-containing inorganic base, a calcium-containing inorganic base, a magnesium-containing inorganic base, or any combination thereof.

Aspect 18. The process defined in any one of the preceding aspects, wherein the inorganic base comprises any suitable inorganic base or any inorganic base disclosed herein, e.g., ZnO, $Zn(OH)_2$, $ZnCO_3$, $Al(OH)_3$, $Al_2O_3$, AlOOH, $Fe_2O_3$, $Fe(OH)_3$, $Fe(OH)_2$, $MnO_2$, $Mn(OH)_2$, $Ca(OH)_2$, $CaCO_3$, $Mg(OH)_2$, $MgCO_3$, etc., or any combination thereof.

Aspect 19. The process defined in any one of the preceding aspects, wherein the inorganic base comprises ZnO, $Zn(OH)_2$, $ZnCO_3$, or any combination thereof.

Aspect 20. The process defined in any one of the preceding aspects, wherein the pH is in any suitable range or any range disclosed herein, e.g., from about 4 to about 8, from about 4 to about 7.5, from about 4 to about 6, from about 4 to about 5.5, from about 4 to about 5, from about 4.2 to about 7.5, from about 4.2 to about 6.8, from about 4.2 to about 5.5, from about 4.5 to about 7.5, from about 4.5 to about 6.5, from about 5 to about 8, from about 5 to about 7, from about 5 to about 6, etc.

Aspect 21. The process defined in any one of the preceding aspects, wherein the solid oxide comprises any suitable solid oxide or any solid oxide disclosed herein, e.g., alumina, titania, zirconia, magnesia, boria, silica-alumina, silica-coated alumina, silica-titania, silica-zirconia, alumina-boria, etc., or any combination thereof.

Aspect 22. The process defined in any one of the preceding aspects, wherein the fluorided solid oxide comprises any suitable fluorided solid oxide or any fluorided solid oxide disclosed herein, e.g., fluorided alumina, fluorided titania, fluorided zirconia, fluorided magnesia, fluorided boria, fluorided silica-alumina, fluorided silica-coated alumina, fluorided silica-titania, fluorided silica-zirconia, fluorided alumina-boria, etc., or any combination thereof.

Aspect 23. The process defined in any one of the preceding aspects, wherein the solid oxide comprises silica-coated alumina.

Aspect 24. The process defined in any one of the preceding aspects, wherein the fluorided solid oxide comprises fluorided silica-coated alumina.

Aspect 25. The process defined in any one of aspects 21-24, wherein the silica-coated alumina contains any suitable amount of silica or an amount of silica in any range disclosed herein, e.g., from about 10 to about 80 wt. % silica, from about 20 to about 70 wt. % silica, from about 25 to about 50 wt. % silica, etc., based on the weight of the silica-coated alumina.

Aspect 26. The process defined in any one of the preceding aspects, wherein the fluorided solid oxide contains any suitable amount of fluorine or an amount of fluorine in any range disclosed herein, e.g., from about 0.5 to about 15 wt.

% F, from about 1 to about 12 wt. % F, from about 2 to about 9 wt. % F, etc., based on the weight of the fluorided solid oxide.

Aspect 27. The process defined in any one of the preceding aspects, wherein the fluorided solid oxide contains any suitable amount of the metal of the inorganic base (e.g., Zn, Fe, Mn, Ca, and Mg, either singly or in any combination) or an amount of the metal of the inorganic base in any range disclosed herein, e.g., from about 0.5 to about 15 wt. % metal, from about 1 to about 10 wt. % metal, from about 1.5 to about 8 wt. % metal, etc., based on the weight of the fluorided solid oxide.

Aspect 28. The process defined in any one of the preceding aspects, wherein the fluorided solid oxide has any suitable pore volume or a pore volume in any range disclosed herein, e.g., from about 0.5 to about 2.5 mL/g, from about 0.5 to about 2 mL/g, from about 0.7 to about 1.5 mL/g, etc.

Aspect 29. The process defined in any one of the preceding aspects, wherein the fluorided solid oxide has any suitable BET surface area or a BET surface area in any range disclosed herein, e.g., from about 150 to about 700 $m^2/g$, from about 200 to about 700 $m^2/g$, from about 250 to about 500 $m^2/g$, etc.

Aspect 30. The process defined in any one of the preceding aspects, wherein the fluorided solid oxide has any suitable average (d50) particle size or an average particle size in any range disclosed herein, e.g., from about 10 to about 500 microns, from about 25 to about 200 microns, from about 20 to about 100 microns, etc.

Aspect 31. The process defined in any one of the preceding aspects, further comprising a step of drying the fluorided solid oxide using any suitable technique or any technique disclosed herein, e.g., subjecting the fluorided solid oxide to an elevated temperature and optionally sub-atmospheric pressure, spray drying the fluorided solid oxide, etc.

Aspect 32. The process defined in any one of the preceding aspects, further comprising a step of calcining the fluorided solid oxide at any suitable peak calcining temperature or a temperature in any range disclosed herein, e.g., from about 400° C. to about 1000° C., from about 400° C. to about 900° C., from about 500° C. to about 800° C., etc.

Aspect 33. A fluorided solid oxide produced by the process defined in any one of the preceding aspects.

Aspect 34. A catalyst composition comprising a metallocene compound, the fluorided solid oxide defined in aspect 33, and an optional co-catalyst.

Aspect 35. The composition defined in aspect 34, wherein the metallocene compound comprises any suitable metallocene compound or any metallocene compound disclosed herein.

Aspect 36. The composition defined in aspect 34 or 35, wherein the metallocene compound comprises an unbridged zirconium or hafnium based metallocene compound containing two cyclopentadienyl groups, two indenyl groups, or a cyclopentadienyl and an indenyl group.

Aspect 37. The composition defined in any one of aspects 34-36, wherein the metallocene compound comprises a bridged zirconium or hafnium based metallocene compound with a fluorenyl group.

Aspect 38. The composition defined in any one of aspects 34-37, wherein the metallocene compound comprises a bridged zirconium or hafnium based metallocene compound with a cyclopentadienyl group and a fluorenyl group.

Aspect 39. The composition defined in any one of aspects 34-38, wherein the catalyst composition comprises only one metallocene compound.

Aspect 40. The composition defined in any one of aspects 34-38, wherein the catalyst composition comprises two or more metallocene compounds.

Aspect 41. The composition defined in any one of aspects 34-40, wherein the catalyst composition comprises a co-catalyst, e.g., any co-catalyst disclosed herein.

Aspect 42. The composition defined in aspect 41, wherein the co-catalyst comprises an aluminoxane compound, an organoboron or organoborate compound, an ionizing ionic compound, an organoaluminum compound, an organozinc compound, an organomagnesium compound, an organolithium compound, or any combination thereof.

Aspect 43. The composition defined in aspect 41, wherein the co-catalyst comprises any suitable organoaluminum compound or any organoaluminum compound disclosed herein.

Aspect 44. The composition defined in any one of aspects 34-41, wherein the catalyst composition is substantially free of aluminoxane compounds, organoboron or organoborate compounds, ionizing ionic compounds, or combinations thereof.

Aspect 45. The composition defined in any one of aspects 34-44, wherein a catalyst activity of the catalyst composition is in any range disclosed herein, e.g., greater than about 2000 grams, greater than about 4000 grams, greater than about 6000 grams, etc., of polyethylene per gram of the fluorided solid oxide per hour, under slurry polymerization conditions, with a triisobutylaluminum co-catalyst, using isobutane as a diluent, and with a polymerization temperature of 95° C. and a reactor pressure of 400 psig.

Aspect 46. An olefin polymerization process, the process comprising contacting the catalyst composition defined in any one of aspects 34-45 with an olefin monomer and an optional olefin comonomer in a polymerization reactor system under polymerization conditions to produce an olefin polymer.

Aspect 47. An olefin polymerization process, the process comprising:
the process defined in any one of aspects 1-32;
contacting the fluorided solid oxide, a metallocene compound, and an optional co-catalyst to form a catalyst composition; and
contacting the catalyst composition with an olefin monomer and an optional olefin comonomer in a polymerization reactor system under polymerization conditions to produce an olefin polymer.

Aspect 48. The olefin polymerization process defined in aspect 46 or 47, wherein the olefin monomer comprises any olefin monomer disclosed herein, e.g., any $C_2$-$C_{20}$ olefin.

Aspect 49. The olefin polymerization process defined in any one of aspects 46-48, wherein the olefin monomer and the optional olefin comonomer independently comprise a $C_2$-$C_{20}$ alpha-olefin.

Aspect 50. The olefin polymerization process defined in any one of aspects 46-49, wherein the olefin monomer comprises ethylene.

Aspect 51. The olefin polymerization process defined in any one of aspects 46-50, wherein the catalyst composition is contacted with ethylene and an olefin comonomer comprising a $C_3$-$C_{10}$ alpha-olefin.

Aspect 52. The olefin polymerization process defined in any one of aspects 46-51, wherein the catalyst composition is contacted with ethylene and an olefin comonomer comprising 1-butene, 1-hexene, 1-octene, or a mixture thereof.

Aspect 53. The olefin polymerization process defined in any one of aspects 46-49, wherein the olefin monomer comprises propylene.

Aspect 54. The olefin polymerization process defined in any one of aspects 46-53, wherein the polymerization reactor system comprises a batch reactor, a slurry reactor, a gas-phase reactor, a solution reactor, a high pressure reactor, a tubular reactor, an autoclave reactor, or a combination thereof.

Aspect 55. The olefin polymerization process defined in any one of aspects 46-54, wherein the polymerization reactor system comprises a slurry reactor, a gas-phase reactor, a solution reactor, or a combination thereof.

Aspect 56. The olefin polymerization process defined in any one of aspects 46-55, wherein the polymerization reactor system comprises a loop slurry reactor.

Aspect 57. The olefin polymerization process defined in any one of aspects 46-56, wherein the polymerization reactor system comprises a single reactor.

Aspect 58. The olefin polymerization process defined in any one of aspects 46-56, wherein the polymerization reactor system comprises 2 reactors.

Aspect 59. The olefin polymerization process defined in any one of aspects 46-56, wherein the polymerization reactor system comprises more than 2 reactors.

Aspect 60. The olefin polymerization process defined in any one of aspects 46-59, wherein the olefin polymer comprises any olefin polymer disclosed herein.

Aspect 61. The olefin polymerization process defined in any one of aspects 46-52 or 54-60, wherein the olefin polymer comprises an ethylene homopolymer, an ethylene/1-butene copolymer, an ethylene/1-hexene copolymer, and/or an ethylene/1-octene copolymer.

Aspect 62. The olefin polymerization process defined in any one of aspects 46-493 or 53-60, wherein the olefin polymer comprises a polypropylene homopolymer and/or a propylene-based copolymer.

Aspect 63. The olefin polymerization process defined in any one of aspects 46-62, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 64. The olefin polymerization process defined in any one of aspects 46-63, wherein the polymerization conditions are substantially constant, e.g., for a particular polymer grade.

Aspect 65. The olefin polymerization process defined in any one of aspects 46-64, wherein no hydrogen is added to the polymerization reactor system.

Aspect 66. The olefin polymerization process defined in any one of aspects 46-64, wherein hydrogen is added to the polymerization reactor system.

Aspect 67. The olefin polymerization process defined in any one of aspects 46-66, wherein the number-average molecular weight (Mn) of the olefin polymer is in any range disclosed herein, e.g., from about 5,000 to about 150,000 g/mol, from about 5,000 to about 50,000 g/mol, from about 10,000 to about 100,000 g/mol, etc.

Aspect 68. The olefin polymerization process defined in any one of aspects 46-67, wherein the weight-average molecular weight (Mw) of the olefin polymer is in any range disclosed herein, e.g., from about 50,000 to about 700,000 g/mol, from about 75,000 to about 500,000 g/mol, from about 100,000 to about 400,000 g/mol, etc.

Aspect 69. The olefin polymerization process defined in any one of aspects 46-68, wherein the density of the olefin polymer is in any range disclosed herein, e.g., from about 0.89 to about 0.96 g/cm$^3$, from about 0.91 to about 0.95 g/cm$^3$, from about 0.91 to about 0.94 g/cm$^3$, etc.

Aspect 70. The olefin polymerization process defined in any one of aspects 46-69, wherein the melt index (MI) of the olefin polymer is in any range disclosed herein, e.g., from 0 to about 25 g/10 min, from about 0.1 to about 10 g/10 min, from about 0.5 to about 3 g/10 min, etc.

Aspect 71. An olefin polymer produced by the olefin polymerization process defined in any one of aspects 46-70.

Aspect 72. An article of manufacture comprising the olefin polymer defined in aspect 71.

We claim:

1. An olefin polymerization process, the process comprising:
   contacting a catalyst composition with an olefin monomer and an optional olefin comonomer in a polymerization reactor system under polymerization conditions to produce an olefin polymer; wherein the catalyst composition comprises:
   a metallocene compound;
   a fluorided solid oxide comprising:
      a silica-coated alumina containing from about 10 to about 80 wt. % silica;
      from about 0.5 to about 15 wt. % F;
      from about 0.5 to about 15 wt. % Zn; and
      from about 0.2 to about 1.2 wt. % B; and
   optionally, a co-catalyst.

2. The process of claim 1, wherein the fluorided solid oxide comprises:
   from about 3 to about 7 wt. % F;
   from about 1 to about 5 wt. % Zn; and
   from about 0.3 to about 1 wt. % B.

3. The process of claim 2, wherein the silica-coated alumina contains from about 25 to about 50 wt. % silica.

4. The process of claim 1, wherein the fluorided solid oxide has:
   a total pore volume from about 0.5 to about 2.5 mL/g;
   a BET surface area from about 150 to about 700 m$^2$/g; and
   an average (d50) particle size from about 10 to about 100 microns.

5. The process of claim 1, wherein the metallocene compound is an unbridged metallocene compound.

6. The process of claim 1, wherein the metallocene compound is a bridged metallocene compound.

7. The process of claim 1, wherein the catalyst composition comprises two or more metallocene compounds.

8. The process of claim 1, wherein the catalyst composition is contacted with ethylene and an olefin comonomer comprising 1-butene, 1-hexene, 1-octene, or a mixture thereof.

9. The process of claim 1, wherein the polymerization reactor system comprises a loop slurry reactor, a gas-phase reactor, a solution reactor, or a combination thereof.

10. The process of claim 1, wherein the olefin polymer comprises an ethylene homopolymer, an ethylene/1-butene copolymer, an ethylene/1-hexene copolymer, and/or an ethylene/1-octene copolymer.

11. The process of claim 1, wherein the catalyst composition comprises the co-catalyst.

12. The process of claim 11, wherein:
   the polymerization reactor system comprises a loop slurry reactor, a gas-phase reactor, a solution reactor, or a combination thereof; and
   the olefin polymer comprises an ethylene homopolymer, an ethylene/1-butene copolymer, an ethylene/1-hexene copolymer, and/or an ethylene/1-octene copolymer.

13. The process of claim 12, wherein the co-catalyst comprises an aluminoxane compound, an organoboron or organoborate compound, an ionizing ionic compound, an organoaluminum compound, an organozinc compound, an organomagnesium compound, an organolithium compound, or any combination thereof.

14. The process of claim 12, wherein the co-catalyst comprises trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, or any combination thereof.

15. The process of claim 14, wherein the fluorided solid oxide comprises:
   from about 3 to about 7 wt. % F;
   from about 1 to about 5 wt. % Zn; and
   from about 0.3 to about 1 wt. % B.

16. The process of claim 15, wherein the silica-coated alumina contains from about 25 to about 50 wt. % silica.

17. The process of claim 15, wherein the metallocene compound is an unbridged metallocene compound.

18. The process of claim 15, wherein the metallocene compound is a bridged metallocene compound.

19. The process of claim 15, wherein the catalyst composition comprises two or more metallocene compounds.

* * * * *